United States Patent
Fang et al.

(10) Patent No.: US 7,423,788 B2
(45) Date of Patent: *Sep. 9, 2008

(54) IMAGE SCANNER

(75) Inventors: Po-Hua Fang, Taipei (TW); Yin-Chun Huang, Hsinchu (TW)

(73) Assignee: Transpacific IP, Ltd., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/505,664

(22) Filed: Aug. 16, 2006

(65) Prior Publication Data

US 2007/0064280 A1 Mar. 22, 2007

Related U.S. Application Data

(63) Continuation of application No. 10/007,729, filed on Nov. 9, 2001, now Pat. No. 7,149,012.

(51) Int. Cl.
H04N 1/04 (2006.01)
H04N 1/46 (2006.01)
(52) U.S. Cl. .................. 358/497; 358/487; 358/474; 358/509
(58) Field of Classification Search ......... 358/497, 358/487, 474, 408, 494, 509
See application file for complete search history.

(56) References Cited

U.S. PATENT DOCUMENTS

| 5,986,774 | A | 11/1999 | Han |
| 6,069,715 | A * | 5/2000 | Wang ................ 358/498 |
| 6,382,781 | B2 | 5/2002 | Furuhata et al. |
| 6,628,435 | B1 | 9/2003 | Gelbart |
| 6,819,457 | B2 | 11/2004 | Sheng |
| 7,092,131 | B2 * | 8/2006 | Fang ................ 358/474 |

* cited by examiner

Primary Examiner—Houshang Safaipour
(74) Attorney, Agent, or Firm—Stolowitz Ford Cowger LLP

(57) ABSTRACT

The present invention is to provide an image scanner, for scanning a reflection document or a transmission document. The image scanner comprises a shell, a document window glass, a transmission document carrier, and an optical chassis. The shell has a groove on its upper surface. The document window glass is capable of connecting with the groove, for scanning the reflection document. The transmission document carrier is capable of connecting with the groove, for scanning the transmission document. The optical chassis is provided at a proper location, for retrieving the images of the reflection document and the transmission document and converting them to an electronic signal. Wherein, by placing the document window glass or transmission document carrier into the groove, the image scanner is capable of scanning the reflection document or transmission document, respectively.

16 Claims, 9 Drawing Sheets

IMAGE SCANNER

CROSS-REFERENCE TO RELATED APPLICATIONS

This is a Continuation Patent Application of U.S. patent application Ser No. 10/007,729, filed Nov. 9, 2001 now U.S. Pat. No. 7,149,012.

FIELD OF THE INVENTION

The present invention relates to an image scanner, especially to a kind of image scanner that may optionally proceed reflection typed scanning mode or transmission typed scanning mode.

BACKGROUND OF THE INVENTION

Times and technologies are changing daily. Relative electronic techniques are also progressing day by day. The functions of electronic product are enhanced abruptly. Relatively, the peripheries of computer are expanded more and more for providing required necessities in daily lives. The scanner is then a common periphery for a computer. The main function of a scanner is to retrieve an image of scanned document and convert the retrieved image into electronic signals. The electronic signals are again input into a computer to proceed image treatment.

Please refer to FIG. 1A, which shows an example of flatbed scanner of typical type commonly seen in current market. Mainly, a document window glass 15 is provided on the upper surface of the shell 11 of a scanner 1. An optical chassis 14 is driven by a driving apparatus 12 to proceed linear motion along the direction of a guiding rod 13 inside the hollow shell 11 and proceeds image scanning job on a reflection document 2 placed on the document window glass 15.

The above-described flatbed scanner 1 is used to proceed scanning motion of a reflection document 2 (such as photograph or paper). While certain scanning job is proceeded on a transmission document 3 (e.g. transparency) in current market, please refer to FIG. 1B, of which the transmission document 3 is placed behind a transmission document carrier 16. The transmission document carrier 16 fixes the transmission document 3 with a manner of clamping. A second light source 142 again provides "light" incident upon the transmission document 3. An optical chassis 14 is driven by a driving apparatus 12 to proceed linear motion along the direction of a guiding rod 13 inside the hollow shell 11 and proceeds image scanning job on a transmission document 2 placed on the document window glass 15.

Since, when "light" is incident upon the transmission document 3 and an image scanning job is proceeded by the optical chassis 14, a phenomenon of Newton Ring will be occurred because of "light" passing through the document window glass 15, so the scanned out quality is inferior. Therefore, there is an improved scanner of flatbed type to execute image-scanning job of the transmission document 3 in current market. Please refer to FIG. 2, wherein an open groove 111 is arranged at one side surface with transmission document carrier 16. By the application of the transmission document carrier 16 capable of being taken out, it can achieve the function of dual scanning for both the reflection document 2 and the transmission document 3. Namely, when applying reflection typed scanning mode, the reflection document 2 is placed on the document window glass 15 for proceeding scanning job on reflection document 2. While applying transmission typed scanning mode, the transmission document is clamped and fixed by the transmission document carrier 16, and then the transmission document carrier 16 is placed into the open groove 111 for proceeding scanning job on transmission document 3.

In summarizing above description, in order to apply dual scanning modes for both the reflection document 2 and the transmission document 3 for prior flatbed scanner 1, the open groove 111 must be arranged at the shell 11. This will cause complicated structure design and drawback of higher cost. Therefore, in order to reduce cost and promote competition ability for industry, the problem of flatbed scanner 1 is really required urgent solution and breakthrough.

SUMMARY OF THE INVENTION

The main object of the present invention is to provide an image scanner, of which a groove may optionally place document window glass or transmission document carrier such that a function that optionally proceeds dual scanning for both reflection type and transmission type with same groove may be surely achieved.

To achieve above-described object, an image scanner of the present invention, for scanning a reflection document or a transmission document. The image scanner comprises a shell, a document window glass, a transmission document carrier, and an optical chassis. The shell has a groove on its upper surface. The document window glass is capable of connecting with the groove, for scanning the reflection document. The transmission document carrier is capable of connecting with the groove, for scanning the transmission document. The optical chassis is provided at a proper location, for retrieving the images of the reflection document and the transmission document and converting them to an electronic signal.

Wherein, by placing the document window glass or transmission document carrier into the groove, the image scanner is capable of scanning the reflection document or transmission document, respectively.

An image scanner of a further embodiment according to the invention may optionally proceed scanning job on reflection document or transmission document. The image scanner, comprising: a shell and a fixing mechanism. The shell has a groove on its upper surface, and at least one open hole is provided at an appropriate position on the upper portion of the groove. The fixing mechanism is capable of connecting to the open hole.

Wherein, the groove provided for placing a document window glass for proceeding scanning job on the reflection document with the document window glass being secured by the fixing mechanism, and the groove provided for placing a transmission document carrier for proceeding scanning job on the transmission document with the transmission document carrier being secured by the fixing mechanism.

For your esteemed reviewing committee to further understand and recognize the present invention, a detailed description matching with corresponding drawings are presented as following.

DETAILED DESCRIPTION OF THE PREFERRED EMBODIMENT

Figure 1A:
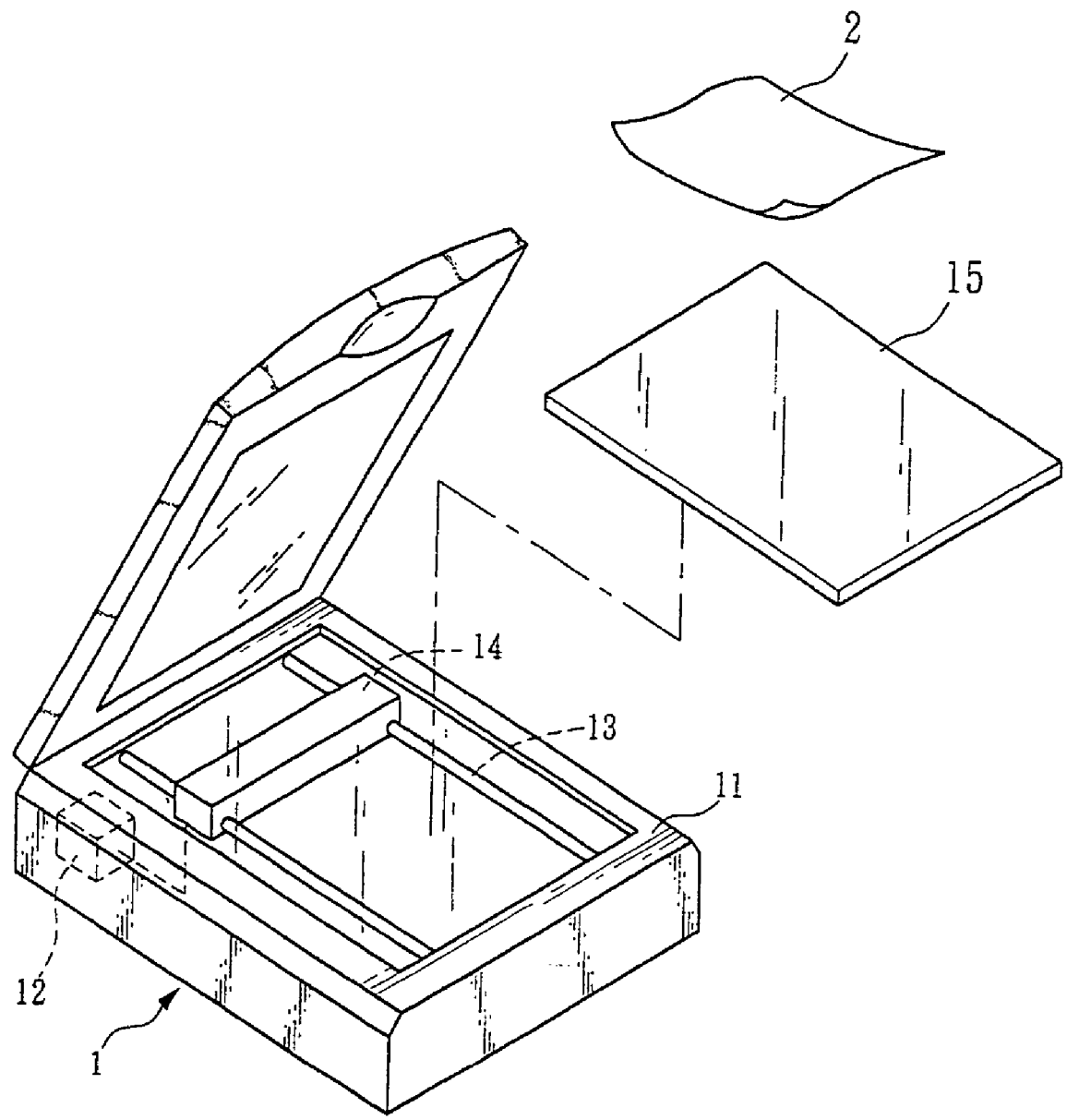
FIG. 1A is an embodiment illustration for a prior flatbed scanner.
Figure 1B:
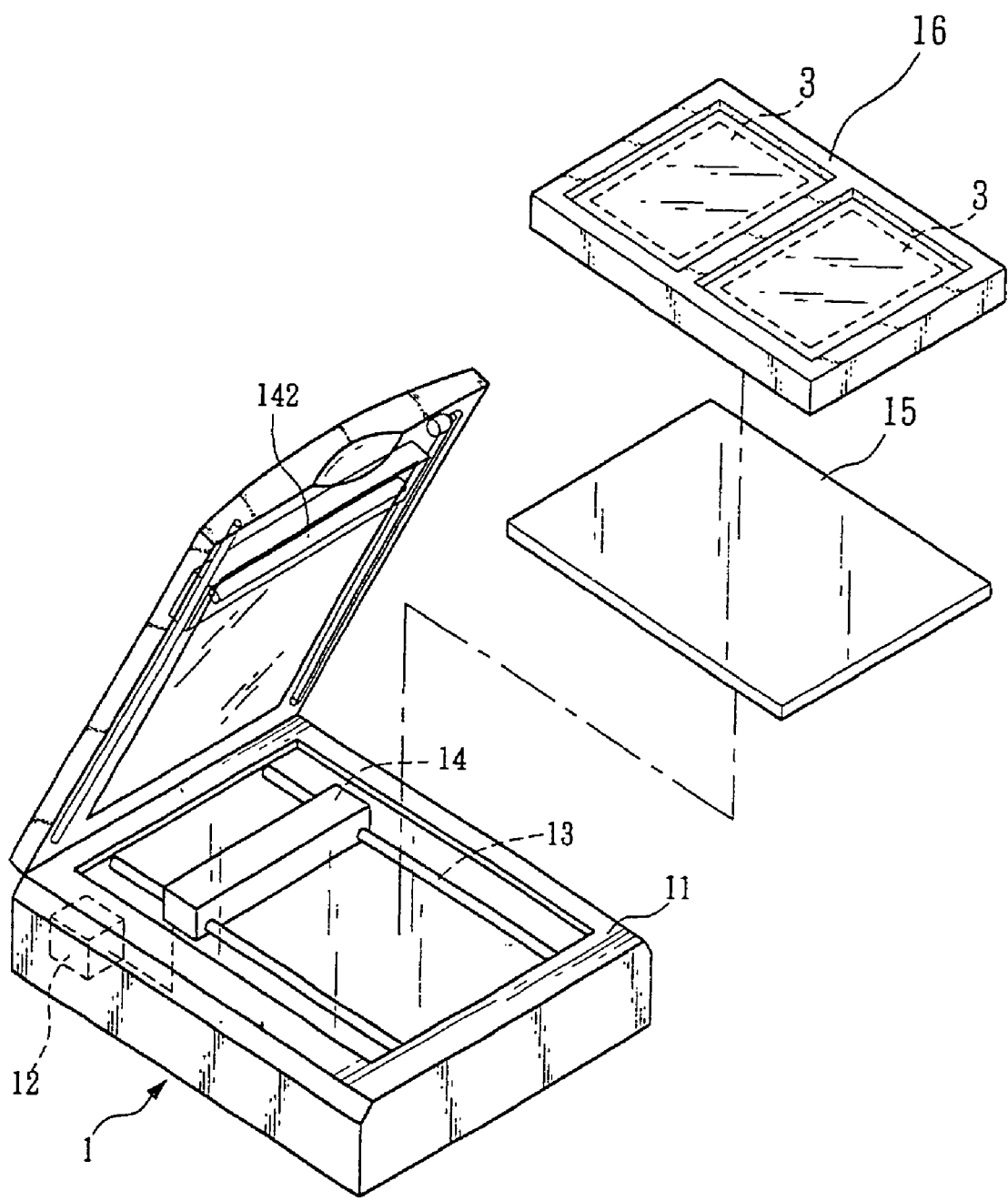
FIG. 1B is an embodiment illustration for the three-dimensional structure of a transmission document carrier combined to a prior flatbed scanner.
Figure 2:
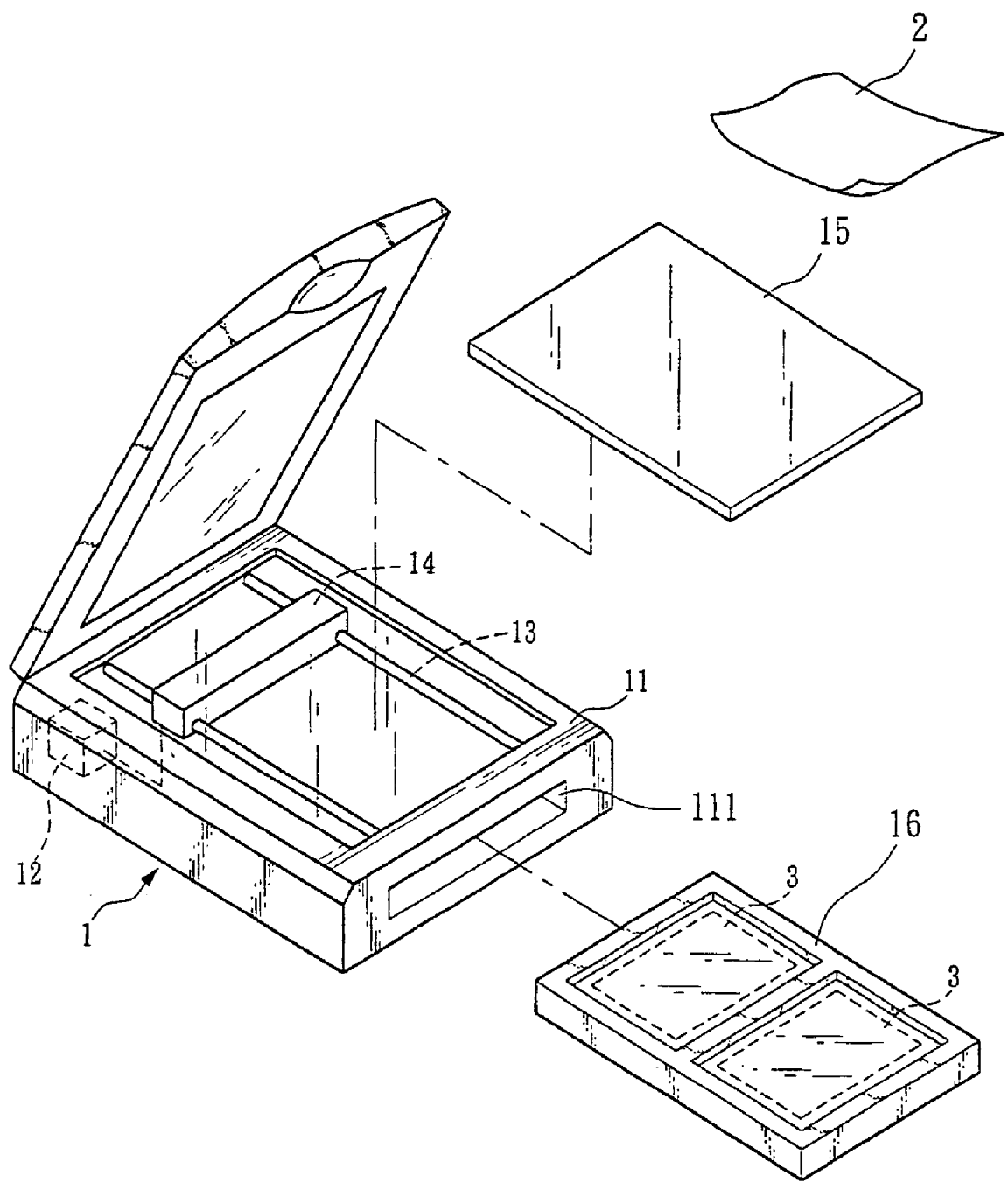
FIG. 2 is a three-dimensional illustration for an embodiment of a transmission document carrier combined with open groove provided by prior flatbed scanner.

The main characteristic of the image scanner of the present invention is that it may optionally decide to proceed reflection document scanning or transmission document scanning, by placing the document window glass or transmission document carrier into the groove, the image scanner is capable of scanning the reflection document or transmission document, respectively.

Please refer to FIG. 3A through FIG. 4B, which are illustrations of apparatus's structure of preferable embodiments for the image scanner of the present invention. The preferable embodiment of the image scanner 1 of the invention is comprised of a shell 11, a document glass window 15, a transmission document carrier 16, and an optical chassis 14.

The shell 11 is a hollow structure. A groove 112 is arranged on the upper surface of the shell 11. It may optionally decide to proceed reflection document 2 scanning or transmission document 3 scanning, by optionally putting either one of document window glass 15 or transmission document carrier 16 on a groove 112. The optical chassis 14 is arranged at appropriate position corresponding to the groove 112. The optical chassis 14 may retrieve the images of the reflection document 2 and the transmission document 3, and covert the images into electronic signals.

Figure 3A:
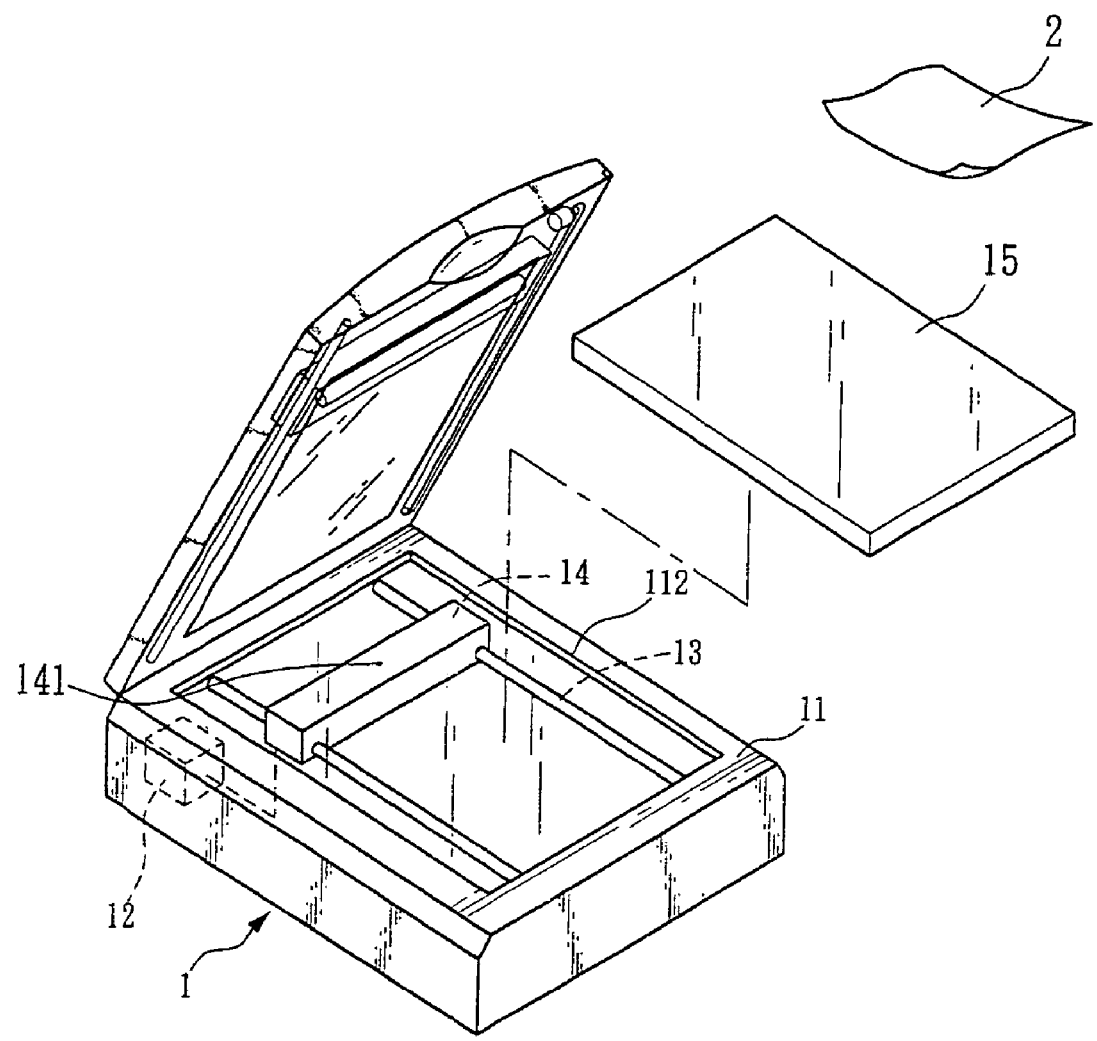
FIG. 3A is an illustration of an apparatus's three-dimensional structure for a preferable embodiment for an image scanner of the present invention in reflection typed scanning mode.
Figure 3B:
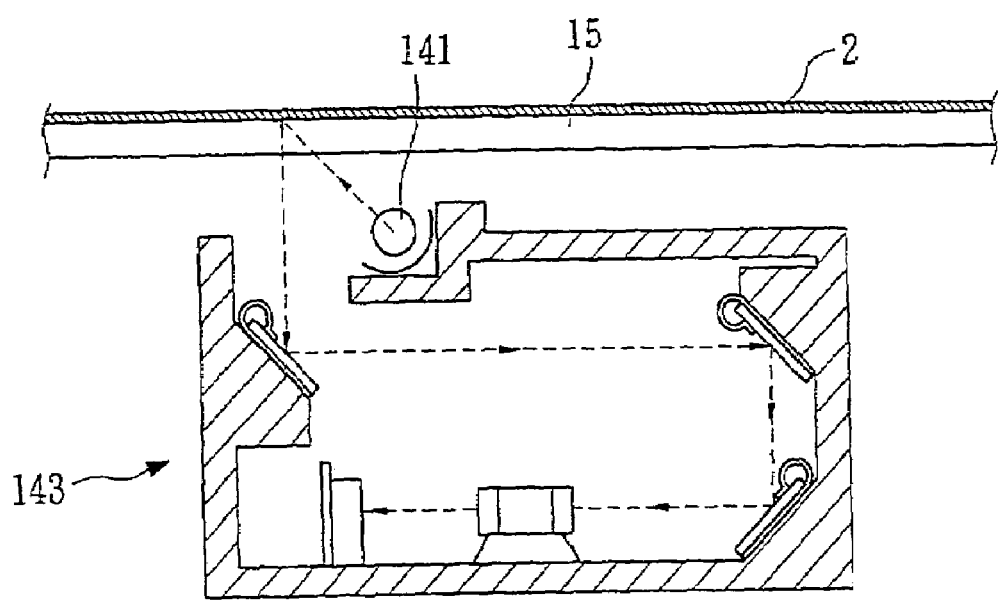
FIG. 3B is a preferable embodiment illustration for a cross section of light-path for an image scanner of the present invention in reflection typed scanning mode.

Please refer to FIG. 3A and FIG. 3B. When deciding to proceed scanning job on the reflection document 2 (such as photograph or paper etc.), the document window glass 15 and the groove 112 are first connected together, and the reflection document 2 is then placed on for proceeding reflection typed scanning job. A first light source 141 provides "light" incident upon the reflection document 2. An optical module 143 again receives the signals of reflective and direction-changed "light", focuses them into images, and converts the images into electronic signals.

Figure 4A:
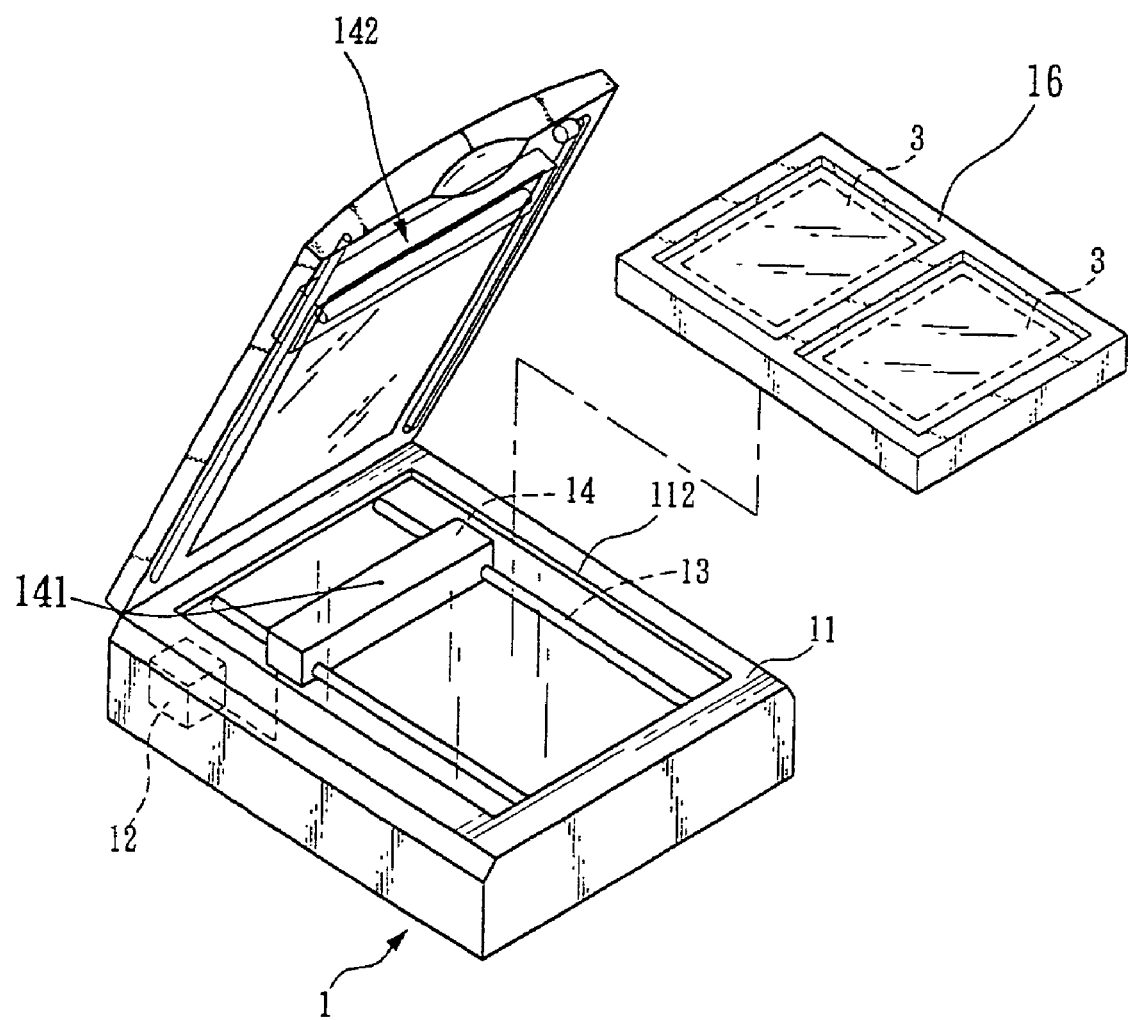
FIG. 4A is an illustration of an apparatus's three-dimensional structure for a preferable embodiment for an image scanner of the present invention in transmission typed scanning mode.
Figure 4B:
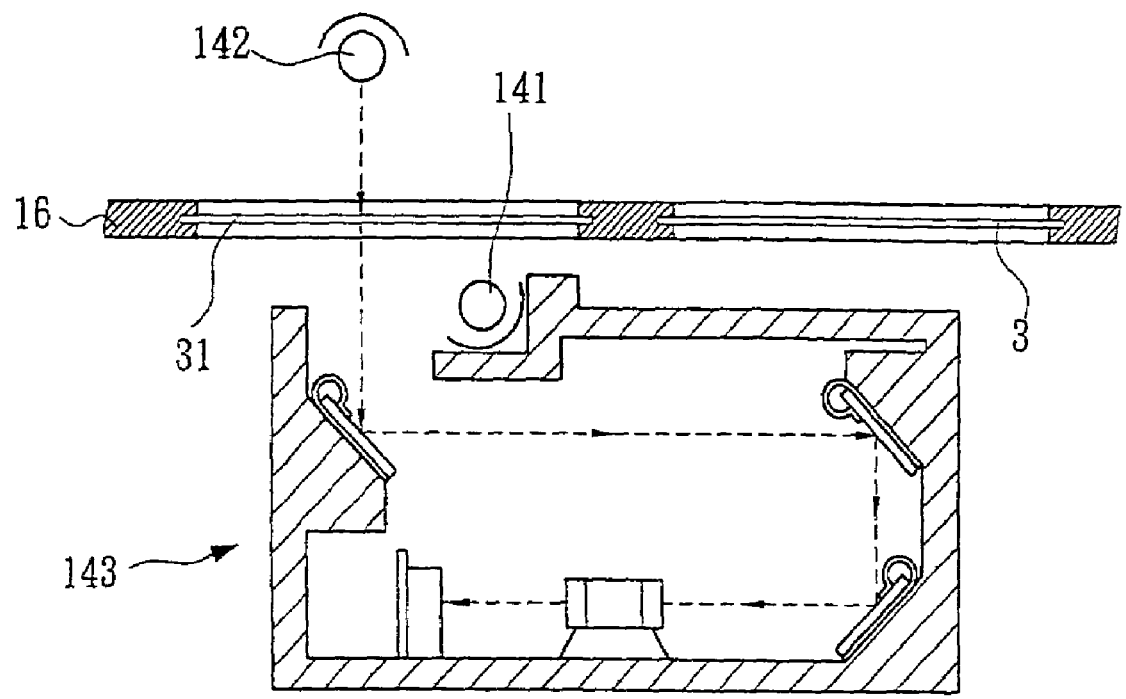
FIG. 4B is a preferable embodiment illustration for a cross section of light-path for an image scanner of the present invention in transmission typed scanning mode.

Please refer to FIG. 4A and FIG. 4B. When deciding to proceed scanning job on the transmission document 3 (such as transparency), the transmission document carrier 16 and the groove 112 are first connected together, and the transmission typed scanning mode is then proceeded. After the transmission document 3 is placed on the transmission document carrier 16, the transmission document carrier 16 fixes the transmission document 3 with a manner of clamping. Again, a second light source 142 provides "light" incident upon the transmission document 3. The optical module 143 receives the incident "light" signals, focuses them into images, and converts the images into electronic signals.

Please refer to FIG. 5A through FIG. 6B, which are illustrations of cross-sectional structure of the preferable embodiments for the fixing mechanism of the present invention. Wherein, at least one open hole 113 is further arranged at appropriate position on the upper portion of the groove 112. The open hole 113 and the fixing mechanism 17 are connected together. When the transmission document carrier (not shown) is placed on the groove 112, the fixing mechanism 17 may be provided for securing the transmission document carrier (not shown). When the document window glass 15 is placed on the groove 112, the fixing mechanism 17 may be provided for securing the document window glass 15.

Figure 5A:
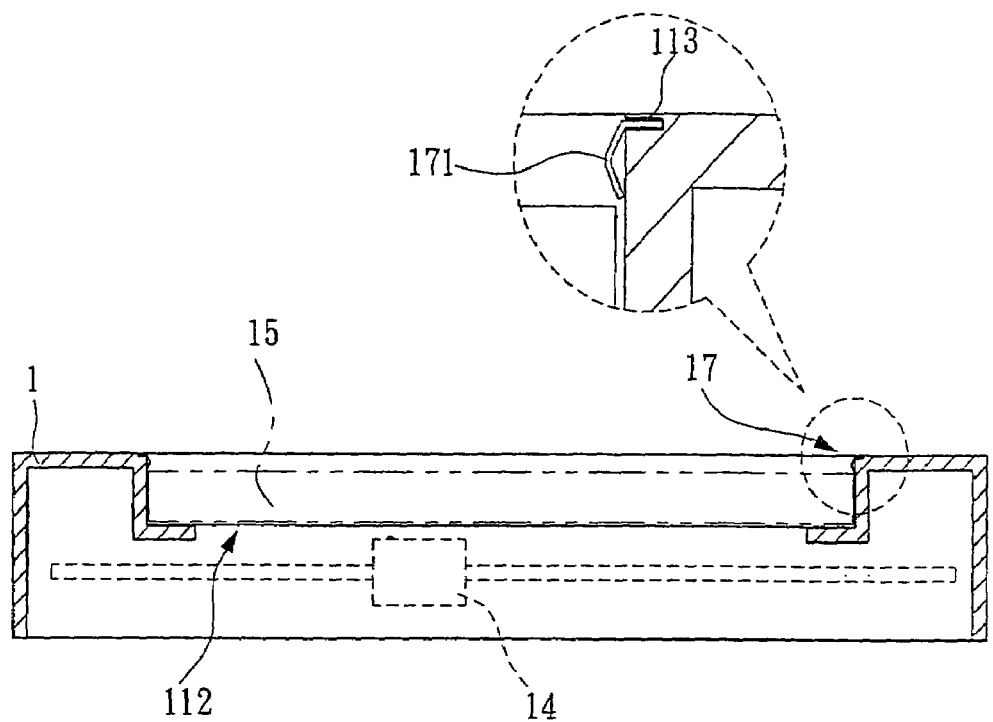
FIG. 5A is an illustration of cross-sectional structure of the first preferable embodiment for the fixing mechanism of the present invention.
Figure 5B:
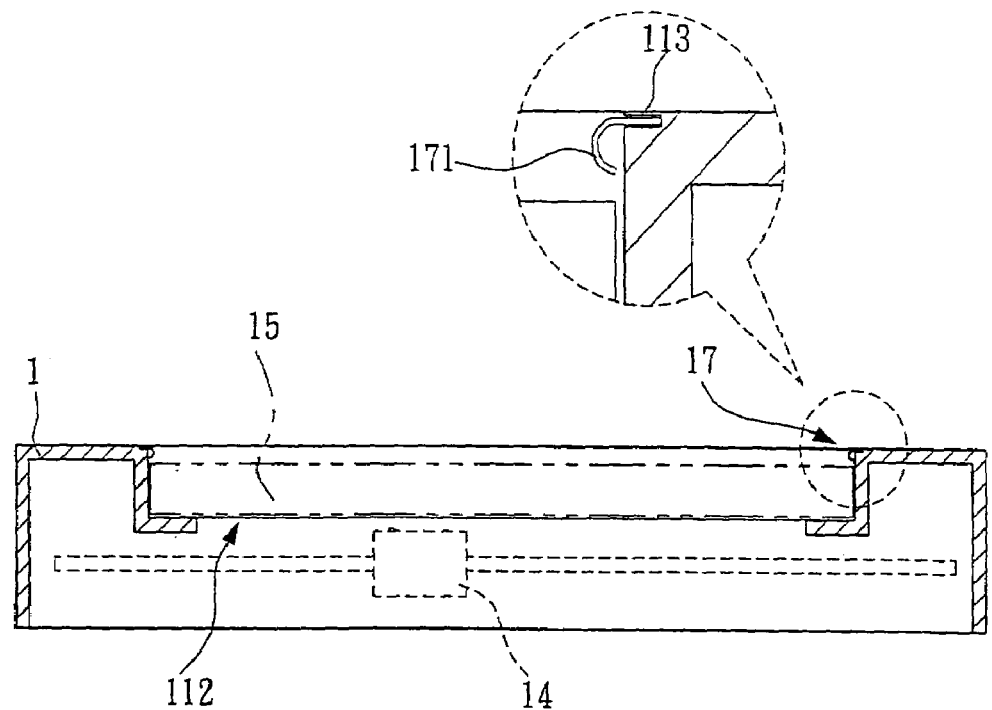
FIG. 5B is an illustration of cross-sectional structure of the second preferable embodiment for the fixing mechanism of the present invention.

Please refer to FIG. 5A and FIG. 5B, which are illustrations of cross-sectional structure of a preferable embodiment for the fixing mechanism of the present invention. Wherein, the fixing mechanism 17 is a spring piece 171, of which one side is connected to the open hole 113 and another side is a free end that may be deformed by applying force. When the document window glass 15 or the transmission document carrier (not shown) is placed on the groove 112, the spring piece 117 is pressed to make the document window glass 15 or the transmission document carrier (not shown) be placed into the groove 112. Afterwards, the spring piece 117 recovers itself by the characteristic of elasticity and then secures the document window glass 15 or the transmission document carrier (not shown) firmly. The shapes of its free end may be a triangle or semi-circular. Of course, it may also be mechanism of other shapes that are designed for achieving same function. This technique can be executed easily by those who are skilled with such arts according to the aforementioned description of the present invention. Therefore, the variations of such kinds are really within the technique scope of the present invention, so further description is not repetitiously presented herein.

Figure 6A:
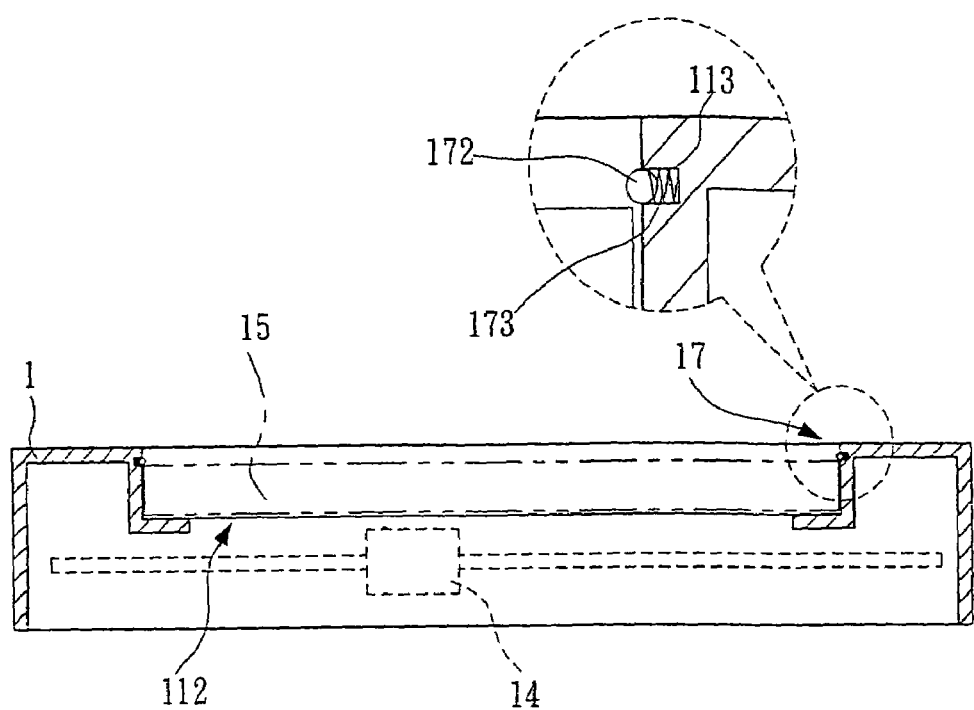
FIG. 6A is an illustration of cross-sectional structure of the third preferable embodiment for the fixing mechanism of the present invention.
Figure 6B:
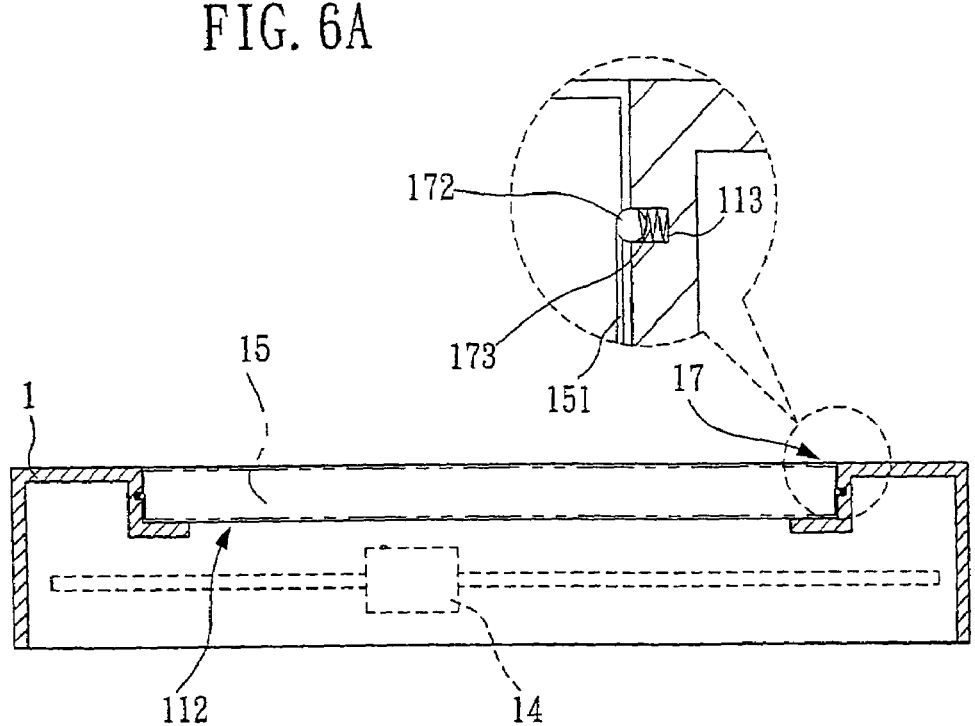
FIG. 6B is an illustration of cross-sectional structure of the fourth preferable embodiment for the fixing mechanism of the present invention.

Please refer to FIG. 6A and FIG. 6B, which are illustrations of cross-sectional structure of another preferable embodiment for the fixing mechanism of the present invention. Wherein, the fixing mechanism 17 is arranged with an elastic element 173 and a blocking bead 172. The blocking bead 172 is moveable within the open hole 113 by the elastic force of the elastic element 173. When the document window glass 15 or the transmission document carrier (not shown) is placed in the groove 112, the blocking bead 172 is touched and subsequently presses the elastic element 173 to make the document window glass 15 or transmission document carrier (not shown) be placed into the groove 112. Afterwards, the elastic element 173 recovers itself by the characteristic of elasticity, then pushes out the blocking bead 173, and further secures the document window glass 15 or the transmission document carrier (not shown) firmly. Of course, other mechanism with same function may be developed. Namely, a hole groove 151 may be deigned at side surface of the document window glass 15 or the transmission document carrier (not shown) corresponding to appropriate position of connection with the blocking bead 172. So, the document window glass 15 or the transmission document carrier (not shown) may be further placed in or taken out in more easy way. This technique can be executed easily by those who are skilled with such arts according to the aforementioned description of the present invention. Therefore, the variations of such kinds are really within the technique scope of the present invention, so further description is not repetitiously presented herein.

What is claimed is:

1. A scanner, comprising:
    a shell, having an upper and lower surface, wherein a groove is formed on the upper surface, said groove having at least one hole formed therein;
    a fixing assembly disposed in the at least one hole, wherein the fixing assembly is adapted to fix a substrate to the groove;
    a first light source to provide light to a document disposed on the substrate; and
    an optical module to receive light reflected from the document disposed on the substrate.

2. The scanner of claim 1, wherein the substrate comprises one of a document window glass and a transmission document carrier.

3. The scanner of claim 1, wherein the fixing assembly comprises an elastic element coupled to a blocking bead that is moveable within the at least one hole.

4. The scanner of claim 2, wherein the elastic element comprises a spring.

5. The scanner of claim 1, wherein the fixing assembly comprises a spring.

6. A method, comprising:
    forming an optical scanner shell having an upper and lower surface;
    forming a groove on the upper surface of the shell;
    forming a hole in the groove; and
    disposing a fixing assembly in the hole, wherein the fixing assembly is adapted to fix a substrate to the groove.

7. The method of claim 6, wherein the substrate comprises one of a document window glass and a transmission document carrier.

8. The method of claim 7, and further comprising:
    disposing a light source substantially in the shell, wherein the light source is adapted to provide light incident on the one of a document window glass and a transmission document carrier; and
    disposing an optical module substantially in the shell, wherein the optical module is adapted to receive light reflected from a document disposed on the one of a document window glass and a transmission document carrier.

9. A scanner comprising:
    a scanner body having a groove to support a substrate for document scanning, the groove having at least one hole formed therein; and
    a fixing assembly disposed in the hole and adapted to fix the substrate to the groove in the scanner body.

10. The scanner of claim 9, wherein the fixing assembly comprises an elastic element coupled to a blocking bead.

11. The scanner of claim 10, wherein said elastic element comprises a spring.

12. A scanner, comprising:
    a body having a groove with a hole formed thereon; and
    a fixing assembly disposed in the hole to fix a substrate to the groove, said fixing assembly adapted to enable selective scanning of transparent type documents or reflection type documents.

13. The scanner of claim 12, wherein the fixing assembly comprises an elastic element coupled to a blocking bead.

14. The scanner of claim 13, wherein the elastic element comprises a spring.

15. The scanner of claim 12, wherein the fixing assembly comprises a spring.

16. The scanner of claim 12, further comprising:
    a first light source disposed on the body, and adapted to provide light incident to a document disposed on the substrate; and
    an optical module disposed on the body, and adapted to receive light reflected from the document disposed on the substrate.

* * * * *